Jan. 24, 1961 R. W. SONNENFELDT 2,969,422

COLOR SYNCHRONIZATION FOR COLOR TELEVISION

Filed Nov. 30, 1951

INVENTOR
RICHARD W. SONNENFELDT
BY
Olin D. Mitchell
ATTORNEY

United States Patent Office 2,969,422
Patented Jan. 24, 1961

2,969,422

COLOR SYNCHRONIZATION FOR COLOR TELEVISION

Richard W. Sonnenfeldt, Haddonfield, N.J., assignor to Radio Corporation of America, a corporation of Delaware Filed Nov. 30, 1951, Ser. No. 259,197

6 Claims. (Cl. 178—5.4)

This invention relates to apparatus for synchronizing the phase of an oscillator with recurrent bursts of alternating energy of the desired frequency and phase.

Frequency analysis shows that a signal train of recurring "bursts" of signal energy are comprised of the mean frequency of the burst itself plus sidebands separated from the burst frequency by multiples of the burst repetition frequency. In some applications, such as in some forms of color television where the burst is repeated at line frequency, the sidebands adjacent to the mean frequency of the burst are separated therefrom by the line scanning frequency of approximately 15 kilocycles. As the mean frequency of the burst is in the order of 3.89 megacycles, the sidebands are spaced from it by a relatively small frequency, and accordingly, unless proper means are provided, circuits adapted to sync the phase of the oscillator with the burst may lock the oscillator on one of the sidebands.

In previous circuits this has been accomplished by applying the burst of synchronizing energy and the output of the oscillator to a phase comparing device that produces a voltage of varying amplitude depending on the relative phases of the bursts and the oscillator. This voltage is applied to a reactance tube so as to control the frequency and phase of the oscillator. A certain degree of noise immunity may be imparted to the control system by terminating the burst in a resonant circuit having high Q. This principle is well known to those skilled in the art. However, any variations in the values of components of the resonant circuit changes the frequency to which it is resonant and even a slight change shifts the phase of the burst as applied to the phase comparator by a large number of degrees. The voltage provided by the phase comparator follows this shift in phase and causes the phase of the oscillator to shift a like amount. Thus the oscillator is adjusted to an incorrect phase.

It is accordingly an object of this invention to provide improved apparatus for locking an oscillator to the phase of the mean frequency of recurrent bursts of alternating current energy.

It is a further object of the invention to provide an improved noise immune system for synchronizing the phase and frequency of an oscillator with a voltage wave of the desired phase and frequency in such manner that variations in the values of components are compensated for by the phase control system itself.

In accordance with this invention these objectives are achieved by injecting the bursts into a high Q tank circuit of the oscillator, rectifying the alternating current energy supplied by the oscillator only during the times the bursts are applied to the oscillator and controlling the phase or frequency of the oscillator in response to the output of the rectifier.

The manner in which this objective is obtained by the present invention will be better understood after a detailed consideration of the drawings in which.

Figure 1:
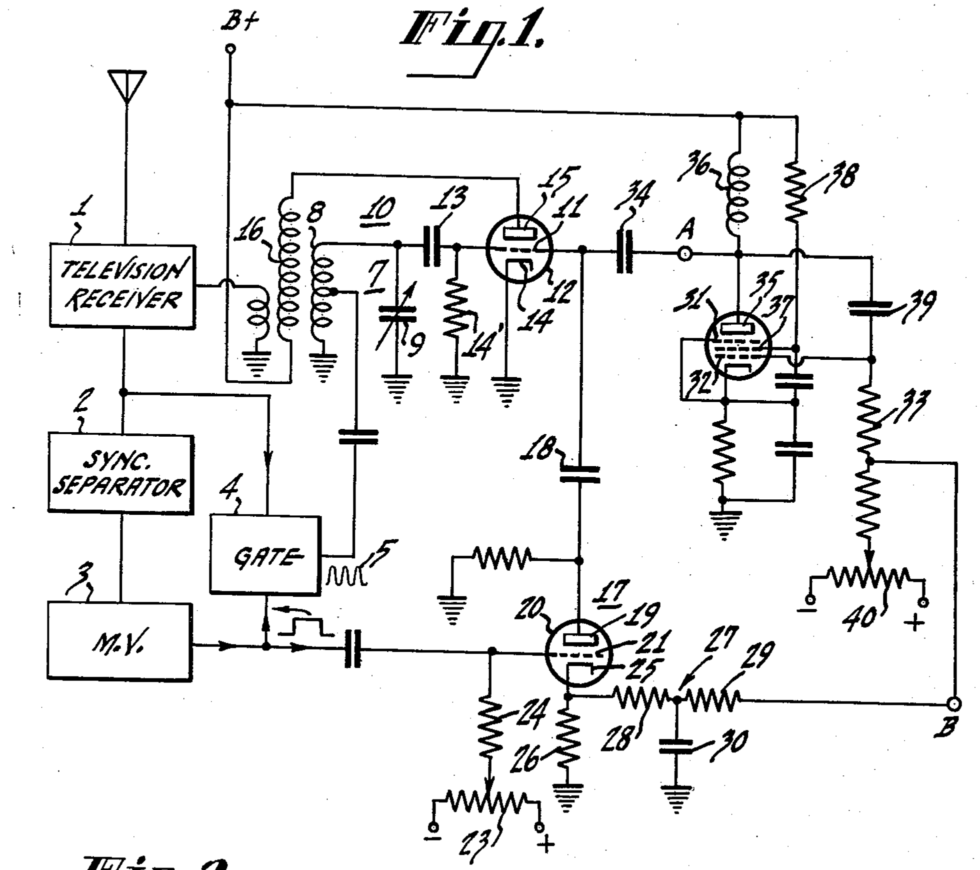
Figure 1 is a schematic diagram of one embodiment of the invention.

In Figure 1 the transmitted television signal is detected in a receiver 1, and applied to apparatus for separating the burst from the rest of the signal. A standard sync separator 2 is coupled to the receiver 1 so as to receive the detected signal and supplies a horizontal sync signal. In a manner known to those skilled in the art, a unistable multivibrator 3 is triggered by the trailing edge of the horizontal sync pulses supplied by the separator so that keying pulses appearing at the output of the multivibrator 3 occur during the back porch interval. These keying pulses are applied to a gate 4 so as to render it capable of passing signals only when a burst is present.

The bursts 5 of alternating control energy that are then produced at the output of the gate 4 are applied so as to energize a tuned circuit 7 of an oscillator 10 that is comprised of an inductance 8 connected in parallel with a condenser 9. If the tuned circuit has a high Q at the burst frequency, when the oscillator is locked to the burst, two advantageous results are obtained. In the first place the narrow bandwidth increases the noise immunity of the control system and prevents the control system from locking the oscillator on a sideband of the burst frequency. These sidebands are spaced on either side of the burst frequency by multiples of the burst recurrence frequency. In addition, because the reactance tube always tunes the tuned circuit to the burst frequency, the tuned circuit, which is the terminating impedance for the burst, has a constant phase angle for the burst. In the particular arrangement shown, the burst is coupled to a mid point in the coil 8. The tuned circuit 10 may be employed in any type of oscillator, but in the particular example shown one end of the tuned circuit is coupled to a grid 11 of an oscillator amplifier 12 by a capacitor 13 and a grid leak resistor 14'. The other end of the tuned circuit 7 is coupled to the cathode 14 of the oscillator amplifier 12. The plate 15 of the amplifier tube is coupled to B+ via a coil 16 and also to the tuned circuit in regenerative fashion by the mutual inductance between the coil 16 and the coil 8 of the tuned circuit.

A portion of the alternating current energy is supplied to a rectifier 17. In this particular arrangement, the oscillator energy is obtained from the grid 11 and is coupled via a condenser 18 to a plate 19 of a triode 20. The keying pulses supplied by the multivibrator 3 are applied to the grid 21 of the triode so as to overcome the cut-off bias placed on the grid by a potentiometer 23 that is connected to the lower end of the grid leak resistor 24. During the keying pulse, the triode 20 conducts and rectifies the oscillator energy applied to its plate. The cathode 25 of the triode 20 is connected to ground via a load resistor 26. A filter 27 comprises of resistors 28 and 29 connected in series and a condenser 30 connected between the junction of said resistors and ground is connected to the cathode 25. The output of the filter 27 is connected to the grid 32 of a reactance tube 31 via a resistor 33. The grid 32 is generally biased so as to set the steady state oscillation of the oscillator 10 at the frequency of the bursts 5 when the voltage output of the rectifier is a maximum.

It will be understood by those skilled in the art that the reactance tube 31 can be coupled to the circuits of the oscillator 10 in many different ways. As shown, the plate 35 of the reactance tube is coupled to the grid 11 of the oscillator tube 12 via a condenser 34. The plate is connected to B+ by a choke coil 36 and the screen grid 37 is connected to B+ by a resistor 38. The reactance tube 31 acts as a variable capacitance in parallel with the tuned circuit 7 owing to the action of a condenser 39 that is connected between the plate and grid of the reactance tube 31.

Figure 2:
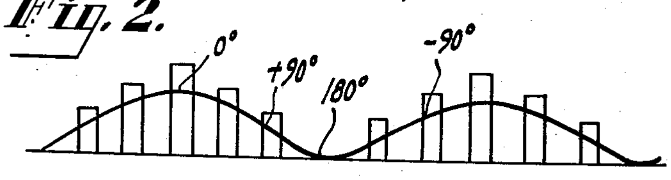
Figures 2 and 3 are graphs useful in explaining the operation of the invention.

The overall operation of the particular circuit shown in Figure 1 will now be discussed in connection with Figure 2. When the oscillator 10 is in proper phase, the burst 5 that is injected into its tank circuit 7 reinforces the oscillation therein and consequently the amplitude of the oscillation increases at the time when burst is present. As the oscillator becomes more and more out of phase with the burst the amount of in-phase energy injected into the tank circuit decreases and the increase in the amplitude of the oscillation caused by the burst becomes less and less. When the oscillator and the burst are 90° out of phase, the burst produces no substantial change in the amplitude of the oscillation. As the phase relationship changes from 90° to 180° the burst actually reduces the amplitude of the oscillation by increasing amounts. The voltage supplied by the rectifier 17 to the reactance tube therefore decreases from a maximum value when the burst and oscillator are in phase to a minimum value when they are 180° out of phase. When more and more current flows through the rectance tube it acts like a greater and greater capacitance, and because it is in parallel with the tuned circuit 7 of the oscillator it lowers the frequency of the oscillator more and more. When the oscillator is operating in proper phase and frequency with respect to the burst, the rectifier 17 supplies a voltage that is substantially midway between the maximum and minimum values noted above. The voltage at the grid of the reactance tube is the sum of the voltage supplied by the rectifier and that supplied by a potentiometer 40. The potentiometer 40 is adjusted so that the oscillator operates at the proper frequency when the bursts are not present.

Figure 3:
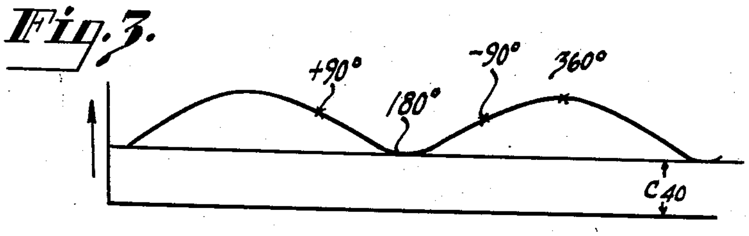

The operation of the circuit of Figure 1 will now be explained in connection with the graphs of Figures 2 and 3. The pulses shown in Figure 2 are the rectified bursts appearing at the cathode of the gated rectifier 17. As pointed out above, the burst and thus the output of the rectifier are at a maximum when the burst and the oscillator are in phase as indicated by the pulse at the 0° point in Figure 2. As the burst and the oscillator get out of phase the amplitude of the burst decreases until it is a minimum at the 180° point. The envelope of the burst is thus seen to have a frequency equal to the difference in frequency of the oscillator and the burst. After the rectified burst is passed through the filter 27 it is smoothed out so as to form an envelope as indicated. This envelope voltage is added to the potential supplied by the potentiometer 40 and applied so as to control the conduction of the reactance tube 31. The capacitative effect of the reactance tube 31 is proportional to its conduction and therefore in the linear portion of its range it is proportional to the voltage applied to its grid. Accordingly the effective capacitance of the reactance tube is plotted as shown in Figure 3 wherein the capacitance below the straight line is introduced by the setting of the potentiometer 40 and the capacitance represented by the curved line is the additional capacity introduced by the rectified burst. The oscillator is tuned by varying the capacitor 9 so that its initial frequency is correct when the reactance tube capacity has the value produced when the burst and the oscillator are 90° out of phase. These points are indicated as +90° and −90° in Figures 2 and 3. Let us assume that the oscillator is operating at the plus 90° point, that is to say that the oscillator frequency is leading the burst frequency by 90°. Let us further assume that the oscillator is distributed so that it speeds up. In this case its phase tends to lead the burst by a greater amount than it previously did and hence rectified bursts have less amplitude and the voltage applied to the grid of the reactance tube decreases. A decrease in the voltage applied to the reactance tube decreases the amount of current flowing through the reactance tube and hence makes the reactance tube appear as a smaller capacity. This in turn causes the oscillator to speed up even more.

It will be noted that in going from the +90° position to 180° phase relationship that the rate at which the oscillator gains in phase with respect to the burst has decreased but that the decrease is continuous. As the oscillator passes to a point such that it is more than 180° in advance of the burst frequency, the voltage applied to the grid of the reactance tube starts to increase. This causes more current to flow through the reactance tube and therefore the reactance tube appears as a larger capacitance. This has the effect of slowing the oscillator down until it reaches the −90° point at which point it will lock in. The oscillator will proceed to a −90° point with respect to the burst regardless of the initial phase relationship in the manner just described. Once the oscillator is at the −90° point any disturbance which causes the oscillator to increase in frequency will cause the voltage represented by the smooth curve of Figures 2 and 3 to increase, which in turn makes the reactance tube draw more current and in turn makes the reactance tube appear like a larger capacity. The net result is that the frequency of the oscillator is decreased. If on the other hand the disturbance is such as to slow down the oscillator, the voltage applied to the reactance tube decreases with the net result that the oscillator speeds up. Thus when the oscillator frequency is 90° behind the burst frequency a stable condition exists as any variation from this phase relationship will cause the correction voltage to vary in the right direction.

Whenever a burst of energy is injected into an oscillator tank circuit as in this particular invention there is a tendency for the oscillator to synchronize itself in in-phase relationship with this burst. However in the present case the energy in the burst is maintained low enough to permit the operation to proceed as outlined above.

It can be seen by pursuing the same type of analysis as set forth above that the stable point of operation is +90° if the reactance tube is arranged so as to appear as an inductance. In this regard it will be remembered the greater the current drawn by the reactance tube the smaller amount of inductance it represents and hence the frequency of the oscillator is increased. This is the opposite to the effect produced when the reactance tube draws little current so as to appear as a capacitance.

Whereas the control system described is adapted to operate in response to bursts of synchronizing energy, it will be realized that the principle of injecting the synchronizing energy into a high Q tank circuit of an oscillator is equally applicable to systems adapted to operate in response to continuous synchronizing waves.

What is claimed is:

1. Synchronizing apparatus adapted to maintain an oscillator in phase and frequency with recurrent bursts of alternating current energy of the desired phase and frequency comprising in combination, an oscillator including a tuned circuit resonant at said desired frequency and operatively connected as the tank circuit of said oscillator, a reactance tube coupled across at least a portion of said tuned circuit, said reactance tube having a control electrode, means for energizing said tuned circuit with said bursts of energy, a rectifier coupled to said tuned circuit so as to receive a portion of its energy, means for coupling said rectifier to said control electrode, means for rendering said rectifier operative only during the presence of said bursts whereby said rectifier is caused to develop a rectified signal, circuit means to filter said rectified signal to develop a control signal, means to apply said control signal to said control electrode which causes said reactance tube to adjust the phase and frequency of said oscillator according to a prescribed relationship with respect to the phase and frequency of said recurrent bursts of alternating current energy.

2. In a color television receiver adapted to receive a color television signal including color synchronizing bursts, said color synchronizing bursts having a predetermined phase and frequency, a burst synchronized color oscillator system comprising in combination, an oscillator having a tuned circuit resonant at said predetermined frequency and connected in said oscillator to operate as a tank circuit, a first gate circuit adapted to receive said color television signal and coupled to said tuned circuit, means for operating said first gate circuit whereby said color synchronizing bursts are gated into said tuned circuit, a second gate circuit, a resistance-condenser network, said second gate circuit coupled between said tuned circuit and said resistance-condenser network and adjusted to conduct only during the presence of said color synchronizing bursts thereby producing a control signal in said resistance-condenser network, said control signal indicative of a reference level which corresponds to the energy present in said tuned circuit during said color synchronizing bursts, said reactance tube coupled to said oscillator and to said resistance-condenser network, said reactance tube responsive to said control signal to control the frequency and phase of oscillations produced in said oscillator according to a prescribed relationship with respect to the frequency and phase of said color synchronizing bursts.

3. In a color television receiver adapted to receive a color television signal including intermittent color synchronizing bursts having a predetermined phase and frequency, a burst synchronized color oscillator system comprising in combination a color oscillator having a tuned circuit resonant at said predetermined frequency and operatively connected as a tank circuit, means for coupling said color synchronizing bursts into said tuned circuit, rectifying means including a gate circuit and employed to rectify at least a portion of the energy supplied by said oscillator during the duration interval of each of said color synchronizing bursts, means to filter said rectified energy to provide a control signal, said reactance tube coupled to said oscillator and said rectifying means and responsive to said control signal to change the frequency and phase of said oscillator in proportion to said control signal whereby said color oscillator is maintained in phase and frequency synchronism with said color synchronizing bursts.

4. In a color television receiver adapted to receive a color television signal including intermittent color synchronizing bursts having a predetermined phase and frequency, a burst synchronized color oscillator system comprising in combination an oscillator, said oscillator including a tank circuit resonant at said predetermined frequency, a frequency control means coupled across at least a portion of said tank circuit to provide control of the frequency of said oscillator, said frequency control means having a control element that controls the amount of effective reactance placed in parallel with said tuned circuit, means for energizing said tuned circuit with said color synchronizing bursts, a rectifier circuit coupled to said oscillator so as to receive a portion of its energy, means for rendering said rectifier circuit operative only during the presence of each of said color synchronizing bursts, and means for filtering the output of said rectifier, means to couple said filtered output to said control element of said frequency control means whereby said oscillator is caused to operate in phase and frequency synchronism with said color synchronizing bursts.

5. Apparatus for synchronizing the phase of an oscillator with recurrent bursts of alternating current energy having a prescribed frequency, comprising in combination, an oscillator having a tuned circuit having resonance at a frequency substantially related to said prescribed frequency and operatively connected as the tank circuit of said oscillator and wherein oscillations are developed by said oscillator, means for injecting said bursts into said tuned circuit, means for rectifying the energy in said tuned circuit for the duration interval of said bursts and including filter means to develop a control signal indicative of the frequency and phase relationship between said bursts and said oscillations, a frequency and phase control means coupled between said tuned circuit and said rectifying means and responsive to said control signal to control the frequency and phase of said oscillator according to a prescribed relationship with respect to said control signal.

6. Apparatus for synchronizing the phase of an oscillator with recurrent bursts of alternating current energy having a prescribed frequency, comprising in combination, an oscillator having a tuned circuit having resonance at a frequency substantially the same as said prescribed frequency and operatively connected as the tank circuit of said oscillator and wherein oscillations are developed by said oscillator, means for injecting said bursts into said tuned circuit, gate circuit means shunted across said tuned circuit for developing a control signal indicative of the energy in said tuned circuit during time intervals coinciding with the duration times of recurrent bursts, said energy derived from both said bursts and said oscillator, frequency and phase control means responsive to said control signal and coupled to said tuned circuit to control the frequency and phase of said oscillator.

References Cited in the file of this patent

UNITED STATES PATENTS

| | | |
|---|---|---|
| 2,288,575 | Stablein | June 30, 1942 |
| 2,594,380 | Barton et al. | Apr. 29, 1952 |
| 2,601,415 | Oliver | June 24, 1952 |
| 2,666,136 | Carpenter | Jan. 12, 1954 |

OTHER REFERENCES

Rider's Television Manual, vol. 2, RCA TV, pages 2–85, 86 (RCA Chassis KCS 25 D1).